US007159477B2

(12) United States Patent  (10) Patent No.: US 7,159,477 B2
Edwin et al.  (45) Date of Patent: Jan. 9, 2007

(54) APPARATUS FOR INSPECTING DEFORMATION OF PIPES

(75) Inventors: Emil Edwin, Trondheim (NO); Tore Arnesen, Ranheim (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/507,493

(22) PCT Filed: Mar. 13, 2002

(86) PCT No.: PCT/EP02/02788

§ 371 (c)(1),
(2), (4) Date: Jan. 19, 2005

(87) PCT Pub. No.: WO03/076869

PCT Pub. Date: Sep. 18, 2003

(65) Prior Publication Data

US 2005/0120812 A1    Jun. 9, 2005

(51) Int. Cl.
*G01M 19/00*    (2006.01)
(52) U.S. Cl. .................. 73/865.8; 73/866.5; 33/174; 33/501.08; 33/501.09; 33/501.1; 33/501.2
(58) Field of Classification Search .............. 73/865.8, 73/866.5; 33/174, 501.08, 501.09, 501.1, 33/501.2
See application file for complete search history.

(56) References Cited

U.S. PATENT DOCUMENTS

| | | | | |
|---|---|---|---|---|
| 1,845,199 A | * | 2/1932 | Schnuck .................. 33/501.07 |
| 3,695,539 A | * | 10/1972 | Lindstaedt .................. 242/559 |
| 3,861,047 A | * | 1/1975 | Dietrich ........................ 33/532 |
| 4,050,293 A | * | 9/1977 | Shimomura et al. .......... 73/105 |
| 4,084,324 A | * | 4/1978 | Whitehouse ................. 33/504 |
| 4,240,206 A | * | 12/1980 | Baresh et al. ................. 33/558 |
| 4,389,788 A | | 6/1983 | Balogh et al. |
| 4,708,300 A | * | 11/1987 | Goetz ......................... 242/551 |
| 4,863,335 A | * | 9/1989 | Herigstad et al. ........... 414/495 |

(Continued)

FOREIGN PATENT DOCUMENTS

EP    282687 A2 *    9/1988

(Continued)

OTHER PUBLICATIONS

Frank, Ernest, "Electrical Measurement and Analysis", 1959, McGraw Hill Book Company, Inc., pp. 132-157.*

*Primary Examiner*—Hezron Williams
*Assistant Examiner*—Samir M. Shah
(74) *Attorney, Agent, or Firm*—Nixon & Vanderhye P.C.

(57) ABSTRACT

An apparatus is provided for measuring deformation of a surface of a pipe. The apparatus has a central portion to which a detector section is mounted. At each side, guides are connected to the housing via arms. The housing has a platform below which an inverted U-shaped section is provided, with the platform forming the base of the U. At the rear of this section a wheel is rotatably mounted on an axle. Forward of this, and also within the U-shaped section is mounted a further U-shaped section. This is pivotally mounted at its rear end by means of a pin such that its forward end is free to move vertically. The forward end has mounted within it a further wheel on an axle. Projecting upwards from the second U-shaped section is a rod which passes through a hole in platform. Around the lower portion of the rod is provided a spring which biases the detector downwards and away from the platform. The rod moves vertically with the wheel as it passes over bumps in the pipe. The rod is connected to a potentiometer which varies an output voltage. By correlating the variations in the output voltage with the distance moved by the detector, deformations in the pipe may be mapped.

13 Claims, 3 Drawing Sheets

U.S. PATENT DOCUMENTS

| | | | | |
|---|---|---|---|---|
| 4,903,413 A * | 2/1990 | Bellwood | ............ | 33/551 |
| 4,948,060 A * | 8/1990 | Kurz et al. | ............ | 242/552 |
| 5,067,871 A * | 11/1991 | Hilber | ............ | 414/807 |
| 5,076,751 A * | 12/1991 | Kafka | ............ | 414/282 |
| 5,088,207 A * | 2/1992 | Betsill et al. | ............ | 33/555.3 |
| 5,335,422 A * | 8/1994 | Ferguson | ............ | 33/553 |
| 5,337,485 A * | 8/1994 | Chien | ............ | 33/550 |
| 5,353,356 A * | 10/1994 | Waugh et al. | ............ | 382/143 |
| 5,388,955 A * | 2/1995 | Schroder | ............ | 414/279 |
| 5,535,143 A * | 7/1996 | Face | ............ | 702/165 |
| 5,623,107 A * | 4/1997 | Patterson et al. | ............ | 73/865.8 |
| 6,155,516 A * | 12/2000 | Lehrieder et al. | ............ | 242/559.3 |
| 6,287,217 B1 * | 9/2001 | Sullivan et al. | ............ | 473/374 |
| 6,288,664 B1 * | 9/2001 | Swanson | ............ | 341/155 |
| 6,556,957 B1 * | 4/2003 | Daumer | ............ | 702/193 |
| 6,558,913 B1 * | 5/2003 | Bertina et al. | ............ | 435/13 |
| 6,568,096 B1 * | 5/2003 | Svitkin et al. | ............ | 33/550 |
| 6,685,130 B1 * | 2/2004 | Stauber et al. | ............ | 242/533.8 |
| 6,782,631 B1 * | 8/2004 | Face, III | ............ | 33/533 |
| 6,820,347 B1 * | 11/2004 | Mellander | ............ | 33/555.1 |
| 2002/0068270 A1 * | 6/2002 | Crawford | ............ | 435/4 |
| 2002/0087389 A1 * | 7/2002 | Sklarz et al. | ............ | 705/10 |
| 2003/0233894 A1 * | 12/2003 | Tezuka et al. | ............ | 73/865.8 |

FOREIGN PATENT DOCUMENTS

| | | | |
|---|---|---|---|
| EP | 507553 A2 * | 10/1992 | |
| JP | 60073413 A * | 4/1985 | |
| JP | 61 215901 A | 9/1986 | |
| JP | 63288708 A * | 11/1988 | |
| JP | 08-050014 | 2/1996 | |
| JP | 09-229655 | 9/1997 | |
| JP | 11-211700 | 8/1999 | |
| WO | WO 9118260 A1 * | 11/1991 | |
| WO | WO 9508095 A1 * | 3/1995 | |
| WO | WO 9936616 A1 * | 7/1999 | |
| WO | WO 9967758 A1 * | 12/1999 | |

* cited by examiner

APPARATUS FOR INSPECTING DEFORMATION OF PIPES

This application is the U.S. national phase of international application PCT/EP02/02788 filed 13 Mar. 2002, which designated the U.S. The entire contents of this application is incorporated herein by reference.

BACKGROUND OF THE INVENTION.

The present invention provides an apparatus for measuring deformation of pipes and tubes. The apparatus is particularly useful in the field of chemical process technology where deformation may be caused by uneven heating of pipes and tubes. The invention also provides a method of measuring deformation of pipes and tubes.

In a thermal cracker unit where heat is used to convert saturated hydrocarbons into unsaturated hydrocarbons, the reaction mixture is generally passed through a furnace in metallic reactor tubes. Cracker units of this type are used in the process industry in order to provide a feedstock of unsaturated hydrocarbon for polymer production and other applications.

In order to heat the hydrocarbon reaction mixture in the reaction tubes of the cracker unit, a furnace is generally provided in a chamber containing a large number of cracker tubes which run parallel to one another through the chamber e.g. the pipes may run vertically from floor to ceiling of the chamber. However, the positioning of the furnace burners relative to the pipes has a tendency to cause hot spots in various parts of the chamber, and as a result the pipes are subject to temperature differentials. In particular, one side of the pipe i.e. the side closest to the heat source may be subject to higher temperatures than the other side, and this leads to a problem with circumferential creep i.e. deformation of the pipe around its circumference.

The working lifetime of the reaction tubes is shortened by this phenomenon, and hence the tubes need to be inspected regularly and replaced when they become deformed. Indeed, if circumferential creep is not detected in time and replacement tubes are inserted before the tubes fail, the cracker unit may have to be shut down immediately resulting in lost production time. At worst, this problem presents a serious safety risk.

Regular inspections of the cracker tubes are carried out when the cracker unit is shut down for routine maintenance and repair. However the existing methods of measuring the deformation of cracker tubes are time consuming and inefficient. Visual inspection and manual measurement of pipe diameter/circumference is often inconvenient because the pipes are close to one another, impeding access to the pipes. Furthermore, scaffolding may be necessary in large chambers in order to reach the top part of the pipes.

Japanese Patent Application No. 08063873 of Japan Energy discloses an apparatus for inspecting pipelines by using a radiation source that is moved along the pipes to detect corrosion. This apparatus is however designed to detect corrosion in pipes, rather than circumferential deformation. Furthermore, the method was developed to enable inspection of pipes without removing a heat insulation layer around the pipe. This renders the apparatus unnecessarily complex for use in cracker units in which the pipes are not insulated.

Japanese Patent Application No. 11-211700 discloses an apparatus that uses ultrasound to detect creep damage in pipes by determining the maximum roughness of the pipe. The apparatus transmits a sound wave into the pipe such that it passes through the pipe to a circumferentially offset receiving probe. A further probe detects the echoes of reflected waves. However this apparatus is disadvantageous because as well as requiring a source of ultrasound and detector probes, comparatively complex calibration and analysis of the output data is required.

It will therefore be seen that the prior art does not provide a cost-effective and efficient way to measure deformation in pipes such as those found in petroleum crackers.

SUMMARY OF THE INVENTION.

Viewed from one aspect, the invention provides an apparatus for measuring deformation of a surface of a pipe comprising a detector capable of directly detecting changes in the radius of a pipe and guide(s) for guiding the detector along the pipe in a direction parallel to the longitudinal axis of the pipe, whereby an output related to the deformation of the pipe surface is derived from the output of the detector.

Thus, the apparatus may be guided along a pipe which is being tested such that it directly measures changes in the radius of the pipe such as bulges caused by circumferential creep. The apparatus typically does this by the detector being arranged to measure the distance between a region of the pipe adjacent the detector and a part of the apparatus.

Although various sensing devices may be used, such as laser-based optical distance sensors, sonic sensors, etc., it is preferred that the detector is arranged to be placed in contact with the surface of the pipe and is moveable in the radial direction of the pipe. In this way, the deformation of the pipe surface may be determined from the displacement of the detector.

Such a measurement apparatus of the invention is ideally suited to measure the deformation of a pipe, especially cracker tubes, because it is mechanically simple and easy to operate. It is not expensive to manufacture and because of its simplicity it is easy to maintain.

Viewed from another aspect there is provided an apparatus for measuring deformation of a surface of a pipe comprising:

(i) detector means capable of detecting changes in the radius of a pipe when placed in contact with the surface of the pipe said detector means being moveable in the radial direction of the pipe at the point of contact (ii) a guide means capable of guiding the detector means along the surface of the pipe in a direction parallel with the longitudinal axis of the pipe, and (iii) measurement means capable of measuring the radial displacement of the detector means whereby to produce an output related to the deformation of the pipe surface.

When the apparatus is in use, the moveable detector is contacted with the pipe and moved along its surface so that it moves over any bulges, bumps and recesses in the surface of the pipe. As the detector moves in the radial direction of the pipe, it remains in contact with the pipe surface as the pipe radius changes due to deformation.

The displacement of the detector means is directly related to the radius of the pipe at the point of contact, and thus the output from the measurement means gives a qualitative, semi-quantitative or quantitative indication of the circumferential deformation of the pipe at the point of contact.

The part of the detector that contacts the pipe may take any suitable form that allows it to maintain contact with the pipe surface whilst it moves over the surface along the pipe. Thus, it may be a smooth surface, possibly provided with a bearing surface of, for example, nylon or a lubricated contact surface. However, the detector is preferably in the form of a rotatable member such as a wheel or roller which is able to rotate freely so that it rolls smoothly over the surface of the pipe. This reduces noise and cuts down on wear to the device and the pipe.

A further advantage of using a rotatable member is that it may be used to determine the total distance travelled by the detector in order to correlate output, concerning the pipe's condition with position. Thus, the number of rotations of the member may be counted. Other rotatable members provided on the device may additionally or alternatively be used for this purpose.

As well as guiding the detector along the pipe, the guide(s) may assist in securing the apparatus firmly in position against the pipe. This is preferably achieved by providing the guide(s) with magnet(s) arranged to hold the apparatus in position against a steel pipe.

In order for the detector to be moveable in the radial direction of the pipe, the detector may conveniently be connected to the guide(s) in such a way that the detector is able to move in the radial direction of the pipe relative to the guide(s), whereas the guide(s) do not move in the radial direction of the pipe. For example, the detector may be attached to the apparatus by means of a pivoted arm, spring or other device which allows it to move in the direction required, i.e. radially from the centre of the pipe, when in use.

The guide(s) are provided in order to guide the detector longitudinally along the pipe. Thus, they maintain the course of the detector along its path, over the surface of the pipe without deviating laterally across the surface of the pipe, i.e. to keep the detector travelling parallel to the longitudinal axis of the pipe. In a preferred embodiment the guide(s) comprise two or more rotatable members such as wheels or rollers that are capable of maintaining contact with the surface of the pipe as the measurement apparatus is moved along the pipe. These members may be similar to the rotatable member discussed above that may be used in the detector.

Preferably, the rotatable members of the guides are connected to the detector means such that they are positioned either side of the detector and with pipe contact points along an imaginary arc having approximately the same radius as the pipe under test. In this way, when the apparatus is in use, the detector and the guides are both in contact with the surface of the pipe at different points around its circumference. It is particularly preferred that at least two of the rotatable members in the guide means are spaced apart from one another and from the detector such that the circumferential distance between the detector and each one of the rotatable members is smaller than the radius of the arc (and hence smaller than the radius of the pipe under test).

Where the guide means comprises two or more rotatable members as described above, the rotatable member of the detector may be movably mounted on a housing or platform with each guide member mounted on an arm extending laterally therefrom.

As explained above, the guide means is primarily required in order to guide the detector means along the desired path on the pipe. However, the guide means may also provide other useful functions. Thus in a preferred embodiment, the distance travelled by the guide may be measured, for example by counting the revolutions of a rotatable member, so that the position of the detector means may be found.

In addition, the guides provide a useful location in which to mount other types of sensing apparatus such that more than one kind of measurement may be made at the same time.

Of course if the position of the detector means is known at any given point along the pipe, the nature of the deformation of the pipe at each point on the pipe can be easily monitored. The shape and size of bulges, bumps and recesses in the pipe at any given point can be mapped in this way. As well as providing direct information about the condition of the pipe under test, such information is extremely useful in building up a picture of the heat distribution inside a furnace when it is in operation. This information is particularly useful to identify hot spots within the furnace chamber and it may be possible to make changes to the chamber design to prevent the problem from reoccurring.

There are a number of ways in which to measure the displacement of the detector means relative to the centre of the pipe under test. A simple and effective way is to use a linear potentiometer arranged to provide a varying output voltage in proportion to the displacement. This may be plotted against linear distance travelled along the pipe.

Although the apparatus of the invention can be moved manually along the pipe it is preferred that the apparatus further comprises transporting means to transport the detector means along the pipe. Such means could take any suitable form such as a device which can be positioned at one end of the pipe with an extending arm which moves the measurement apparatus in a straight path along the pipe. Many suitable mechanisms are known in the art that can achieve this.

It will be appreciated that the invention extends to a corresponding method of measuring deformation of a pipe. Thus, viewed from another aspect, the invention provides a method of measuring the deformation of a surface of a pipe using the apparatus of the invention.

BRIEF DESCRIPTION OF THE DRAWINGS.

Certain embodiments of the invention will now be described, by way of example only, with reference to the accompanying drawings.

DETAILED DISCUSSION OF PREFERRED EMBODIMENTS.

Figure 1:
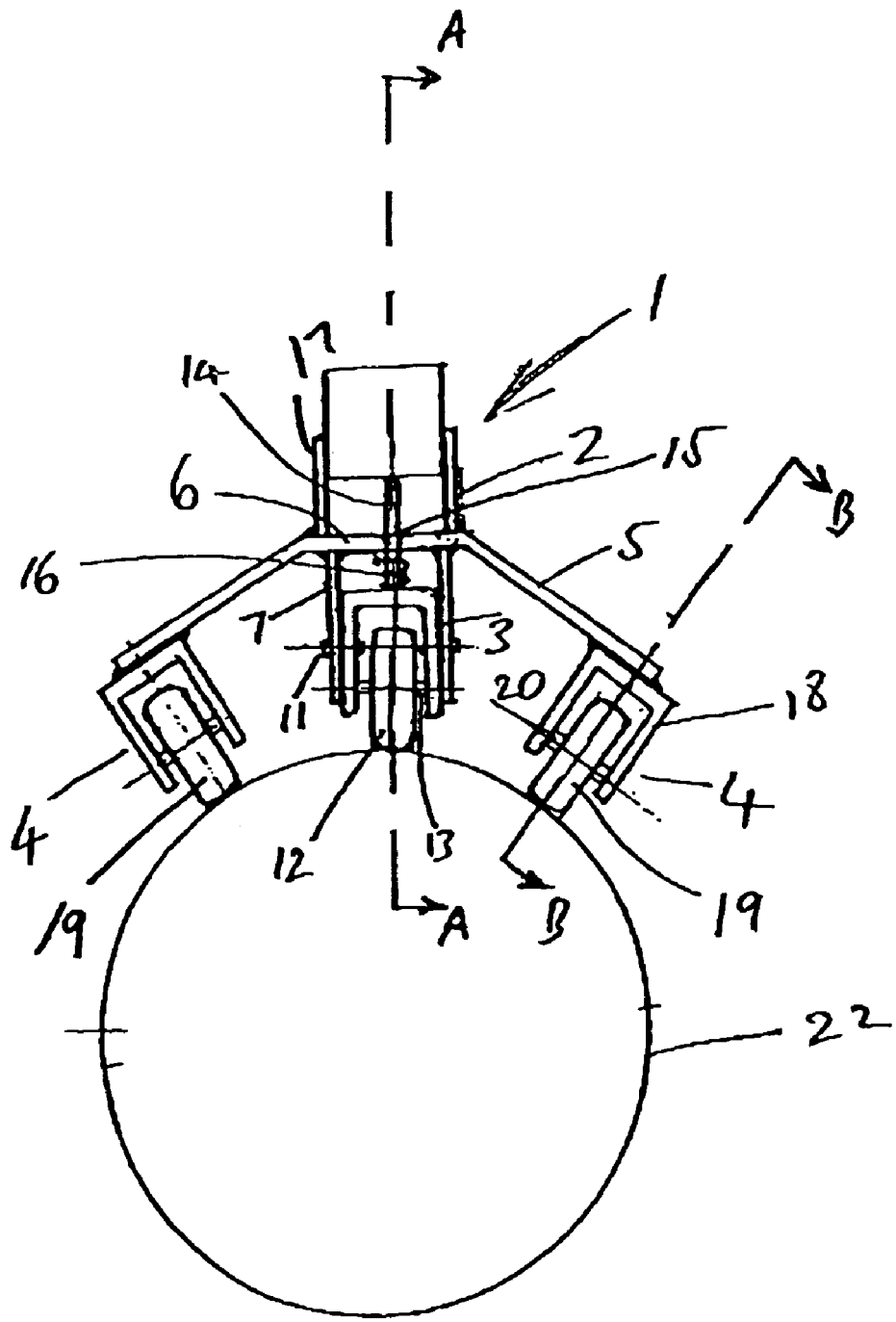
FIG. 1 is an end view of a measurement apparatus in accordance with a preferred embodiment of the invention in use on a section of pipe.

With reference first to FIG. 1, the apparatus 1 is formed with a central portion 2 to which the detector section 3 is mounted. At each side, guides 4 are connected to the housing via arms 5.

As may also be seen from FIG. 2, the housing has a platform 6 below which an inverted U-shaped section 7 is provided, with the platform forming the base of the U. At the rear of this section a wheel is rotatably mounted on an axle 9.

Forward of this, and also within the U-shaped section is mounted a further U-shaped section 10. This is pivotally mounted at its rear end by means of a pin 11 such that its forward end is free to move vertically (in the sense of the figures). That forward end has mounted within it a further wheel 12 on an axle 13.

These components together form a detector as will be discussed below.

Projecting upwards from second U-shaped section 10 is a rod 14 which passes through a hole 15 in platform 6. Mound the lower portion of the rod is provided a spring 16 which biases the detector downwards and away from the platform.

The upper end of the rod 14 extends into an enclosure which is supported above the platform by supports 17. Within the enclosure is provided a linear potentiometer and associated components. Vertical movement of the rod 14 causes the potentiometer to change its resistance such that, when an external voltage is applied, an output voltage is provided in proportion to the movement of the rod. (The electrical components are not shown for reasons of clarity.)

Figure 3:
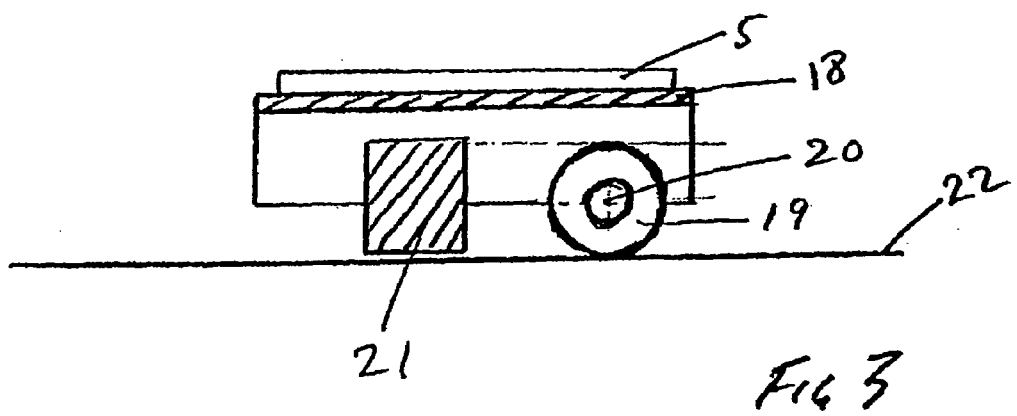
FIG. 3 is a sectional view along the line B—B of the measurement apparatus of FIG. 1.

As may be seen from FIG. 3, the guides 4. (which are similar to each other) comprise inverted U-shaped sections 18 mounted on the distal ends of arms 5. At the forward end of each is mounted a wheel 19 on an axle 20. In addition, behind each wheel is located a permanent magnet 21 (these are omitted from FIG. 1 for clarity).

Figure 2:
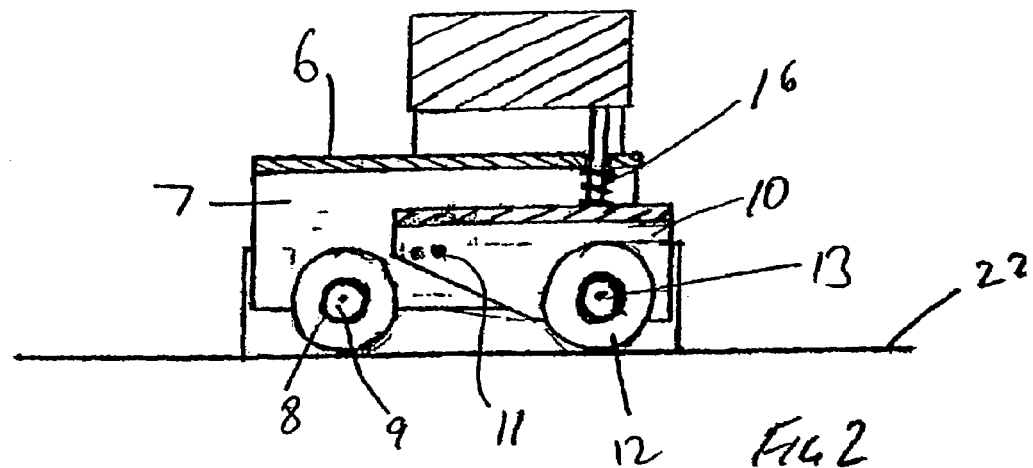
FIG. 2 is a sectional view along the line A—A of the measurement apparatus of FIG. 1.

In operation the apparatus is located on the outside of the pipe under test 22, as shown in FIGS. 1 and 2, such that all four wheels make contact with the surface of the pipe. Wheels 8 and 19 together form a tripod arrangement and wheel 12 moves upwards against the bias force of the spring 16. The attractive force of the magnets 21 serves to hold the apparatus firmly in place against the pipe 22, despite the force of spring 16.

The guide wheels 19 and wheel 8 have parallel axes so they constrain the apparatus to move in a straight line along the pipe and parallel to its axis. It may be moved manually, or by means of an external driver on which it is mounted (not shown). As the apparatus moves, wheel 12 of the detector will move to follow the contours of the pipe—upwards for a bulge, downwards for a recess. As it moves, it causes a corresponding movement of rod 14 which in turn varies the resistance of the potentiometer, as discussed above. This in turn provides a variable output voltage representative of the contours of the pipe.

Figure 5:
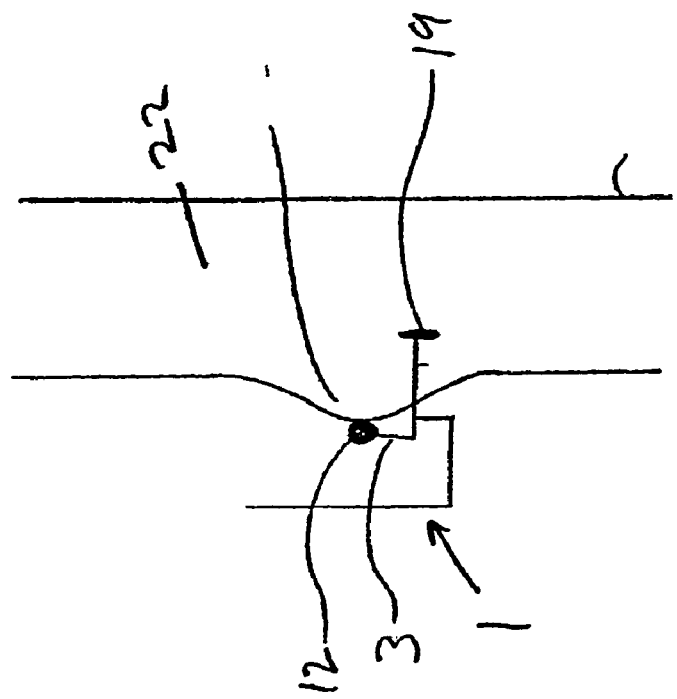
FIGS. 4 and 5 are schematic views of the measurement apparatus of FIG. 1 in use on normal and deformed sections of pipe.
Figure 4:
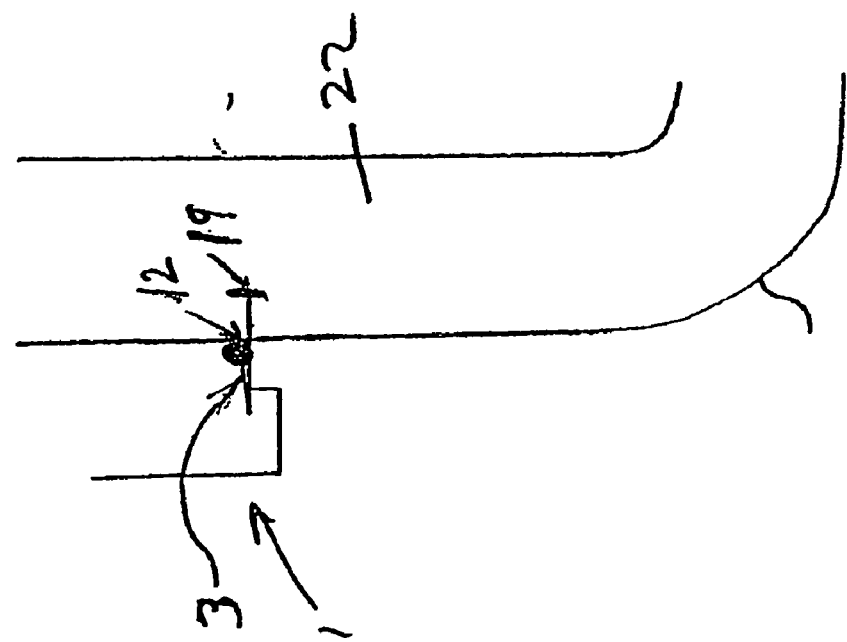

FIGS. 4 and 5 illustrate schematically the effect of a bulge in a pipe on the detector wheel 12. In FIG. 4 the pipe is level so wheel 12, mounted on section 3 is in a low position. In FIG. 5 a bump is encountered which causes wheel 12 to be pushed up, causing section 3 to pivot against spring 12.

By comparing the output voltage with the corresponding position of the apparatus, the pipe may be mapped. This may be automated if, as in a modified embodiment (not illustrated), a device is provided to count the revolutions of wheel 8. This device takes the form of a reed switch that may be closed by a small magnet on wheel 8 as the wheel reaches its uppermost position. By using the reed switch to interrupt a circuit, a pulse is provided for every rotation of wheel 8. A pulse counter then provides a measure of the distance traveled. The output from the potentiometer and from the counter is then fed to a computer where a plot of voltage (i.e., profile) versus pulses (i.e., distance along pipe) may be produced. This may, of course be calibrated to give readings in millimetres and metres respectively.

The invention claimed is:

1. An apparatus for measuring deformation of a surface of a pipe comprising a single detector capable of directly detecting changes in the radius of a pipe and a plurality of guides for guiding the detector along the pipe in a direction parallel to a longitudinal axis of the pipe, the guides comprising rotatable members spaced apart from the detector and arranged to contact a surface of the pipe when the detector is in contact with the pipe, wherein said guides are respectively provided on each side of the detector, the rotatable members of the guides and the detector being positioned substantially along an arc such that in use, the detector and the guides are in contact with the pipe surface at different points around its circumference, and a circumferential distance between each said rotatable member of the guides and the detector being smaller than a radius of the arc, whereby an output related to the deformation of the pipe surface is derived only from the output of the single detector.

2. An apparatus as claimed in claim 1, wherein the detector is arranged to measure the distance between a region of the pipe adjacent the detector and a part of the apparatus.

3. An apparatus as claimed in claim 2, wherein the detector is arranged to be placed in contact with the surface of the pipe and is moveable in the radial direction of the pipe such that the deformation of the pipe surface may be determined from the displacement of the detector.

4. An apparatus as claimed in claim 1, wherein the guides comprise magnets arranged to hold the apparatus in position against a steel pipe.

5. An apparatus as claimed in claim 1, wherein the detector comprises a rotatable member that is arranged to roll over the surface of the pipe.

6. An apparatus as claimed in claim 5, wherein the rotatable member of the detector is movably mounted in a housing and each said guide member is mounted on an arm extending laterally from the housing.

7. An apparatus as claimed in claim 5 comprising measurement means for measuring the displacement of the rotatable member of the detector in relation to the housing.

8. An apparatus as claimed in claim 1 wherein said apparatus further comprises transporting means to transport the detector along the pipe.

9. An apparatus as claimed in claim 1, arranged to measure the distance traveled by the apparatus along the pipe.

10. An apparatus as claimed in claim 9, wherein the distance traveled is determined by measuring the number of rotations of a rotatable member engaged with the pipe.

11. A method of measuring the deformation of a surface of a pipe using the apparatus as claimed in claim 1.

12. An apparatus for detecting deformation of a surface of a pipe comprising:
   (i) a one and only one detector capable of detecting changes in the radius of a pipe when placed in contact with the surface of the pipe, said detector being moveable in a radial direction of the pipe at the point of contact;
   (ii) a guide assembly capable of guiding the detector along the surface of the pipe in a direction parallel with the longitudinal axis of the pipe, wherein the guide assembly comprises rotatable members provided on each side of the detector being positioned substantially along an arc such that in use, the detector and the rotatable members are in contact with the pipe surface at different points around its circumference, a circumferential distance between each said rotatable member and the detector being smaller than a radius of the arc; and
   (iii) measurement means capable of measuring the radial displacement of the detector, thereby to produce an output related to the deformation of the pipe surface.

13. A method of measuring the deformation of a surface of a pipe using the apparatus as claimed in claim 12.

* * * * *